United States Patent [19]

Bowden

[11] Patent Number: 5,375,572
[45] Date of Patent: Dec. 27, 1994

[54] STORAGE INSERT FOR INTERNAL COMBUSTION ENGINES

[76] Inventor: Raoul S. Bowden, 908 W. Grandview Ave., Roseville, Minn. 55113

[21] Appl. No.: 130,244

[22] Filed: Oct. 1, 1993

[51] Int. Cl.⁵ .............................................. F01M 11/10
[52] U.S. Cl. .............................. 123/196 S; 123/198 D; 184/6.4
[58] Field of Search ........... 123/198 R, 196 S, 198 D, 123/286, 196 M, 196 R, 266, 267; 184/198 D, 6.4

[56] References Cited

U.S. PATENT DOCUMENTS 3,481,317 12/1969 Hughes et al. ...................... 123/286

Primary Examiner—E. Rollins Cross
Assistant Examiner—Erick Solis

[57] ABSTRACT

An insert to be threaded into a spark plug hole of an internal combustion engine. The insert includes a reservoir for holding lubricant and a dessicant to protect the engine during periods of storage. The non threaded end of the insert includes a tip on which the spark plug wires may be attached in order to keep the wires in order.

6 Claims, 2 Drawing Sheets

STORAGE INSERT FOR INTERNAL COMBUSTION ENGINES

BACKGROUND OF THE INVENTION

1. Field of the Invention

This invention relates to devices for dispensing lubricants to mechanisms to prevent corrosion and to lower friction and to dry mechanisms to prevent corrosion, and more particularly to devices for dispensing protective lubrication to, or drying internal cylinders, pistons and valves of engines.

2. Description of the Prior Art

The prior art discloses many devices for lubricating machines. Typically these devices deliver lubricant to moving parts and can be fixed like engine oil pumps, oil fittings or mobile hand activated oil cans. Desiccants are usually used by being installed in cavities that contain the mechanisms to be protected or by being placed in containers where the mechanisms are stored. The invention uses either lubricant or a desiccant to protect engines being stored for extended periods of time. The invention differs from the prior art by being threaded especially for spark plug holes. It protects internal engine parts for as long as is needed by delivering lubricant contained in the invention or absorbing moisture by a desiccant contained in the invention.

SUMMARY OF THE INVENTION

An object of this invention is to provide a simple inexpensive insert for dispensing protective lubricant to coat internal engine parts during extended periods of storage.

A further object of an alternate use of the invention is to provide a means for a desiccant to dry internal engine parts.

A still further object of this invention is to provide an insert with a connection for a spark plug wire. This keeps the wire terminals in order prior to reinstalling the spark plugs.

Yet another object of the invention is to have its contents, lubricant or desiccant, observable through the insert's clear plastic construction.

And yet another object of the invention is the delivery of protective lubricant regardless of its position when the invention is fitted with a porous disk and wick.

Briefly, an insert assembly in accordance with the present invention looks like a spark plug on the outside, being typically threaded on one end with a protrusion for receiving a spark pug wire on the other end. The insert is hollow and constructed of clear plastic. The central portion is filled with lubricant or desiccant and an opening at the threaded end is plugged by a porous disk. An insert filled with lubricant when installed in a spark plug hole dispenses lubricant through the porous disk to a combustion chamber. When an insert is filled with a desiccant and installed in a spark plug hole it will dry the combustion chamber preventing damaging corrosion to the parts therein. The protrusion at the end opposite the threads, connects to a spark plug wire terminal. After the inserts are installed the wires are kept in order on the engine prior to reinstalling the spark plugs.

An advantage of this invention is that lubricant will continue dispensing into the engine through wicking action for as long as the insert is installed.

Another advantage is that the inserts can be installed and removed with fingers.

A still further advantage of this invention is that the spark plug wires are kept in order by connection to their respective inserts.

These and other objects and advantages of the present invention will no doubt become apparent upon a reading of the following descriptions and a study of the several figures of the drawing.

DETAILED DESCRIPTION OF THE PREFERRED EMBODIMENT

Figure 1:
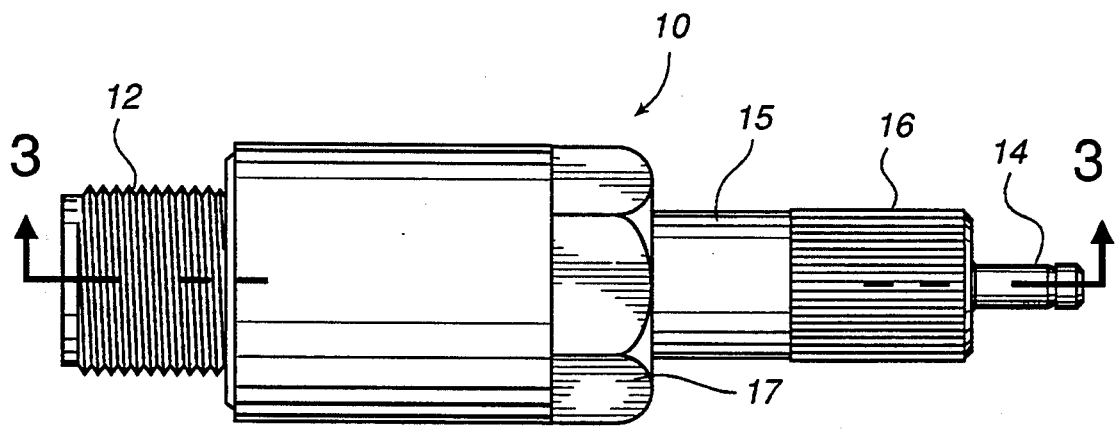
FIG. 1 is a longitudinal view of the insert showing its surface contours.

Referring to FIG. 1, the exterior surface of a storage insert 10 is shown. The insert 10 has threads 12 having the same specifications as spark plug threads. The insert 10 may be produced with different thread sizes matching the thread sizes of various spark plugs produced for many engines.

When a spark plug is removed frown an engine and replaced with the insert 10, the spark plug wire terminal and its accompanying boot is installed on a male connector 14 and an integral stud 15 at the end opposite the threads. When the spark plugs are again installed on an engine, the spark plug wire terminals remain in their correct location by being connected to the inserts. The terminals can then be reinstalled in the correct positions on the spark plugs.

The insert 10 is shown with friction grooves 16 adjacent to the connector 14. Installing this insert finger tight will be satisfactory as the insert does not have to resist pressure or vibration. The insert could have a hexagonal portion 17 like a conventional spark plug to enable the use of a socket. This would be desirable on engines where the spark plugs are especially hard to reach.

Figure 2:
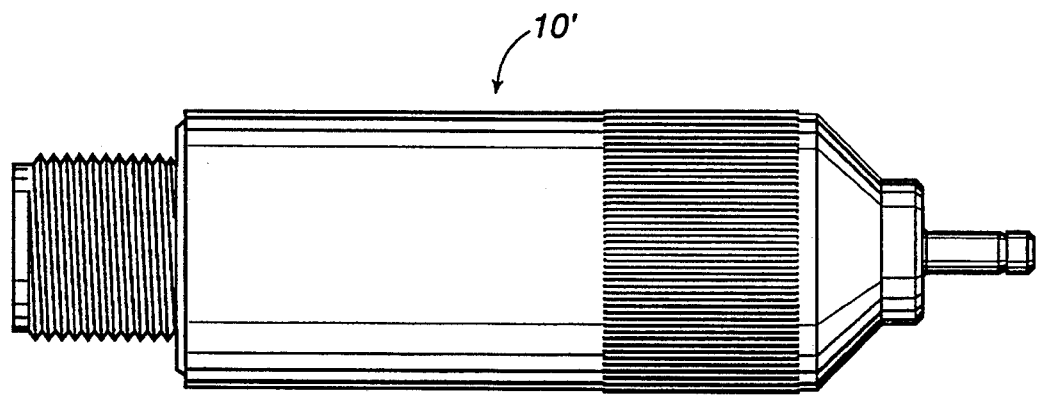
FIG. 2 is an example of an alternate configuration that does not depart from the spirit of the invention.

The insert 10 is shown with a configuration similar to a spark plug; however, a modification in its shape as represented by insert 10', in FIG. 2, could be essentially drum-shaped. Its reservoir would then hold more lubricant or desiccant.

Figure 3:
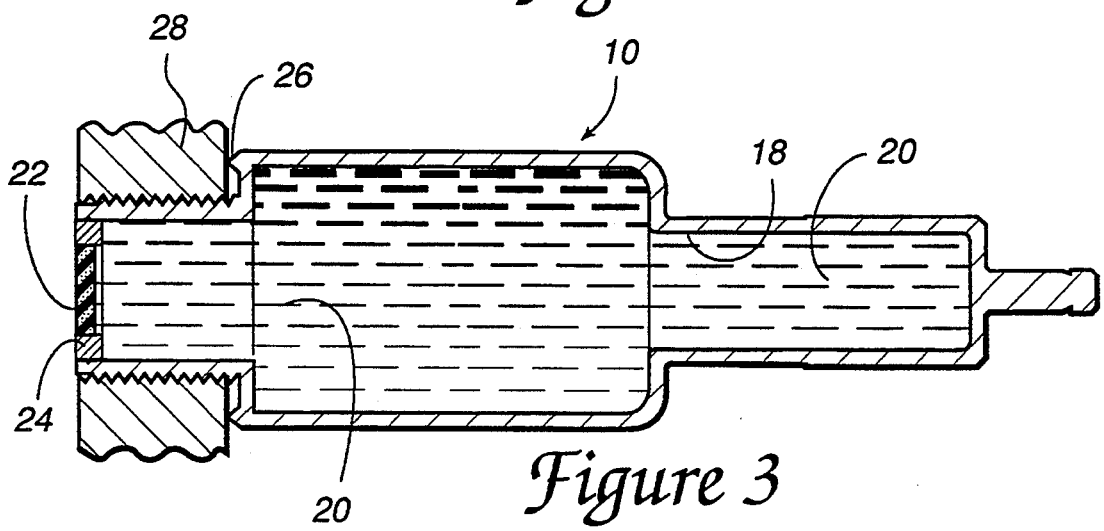
FIG. 3 is a longitudinal section of the insert screwed into a cylinder head indicating a section of the insert from line 3—3 of FIG. 1.

FIG. 3, a longitudinal section indicated at line 3—3 of FIG. 1, shows the internal parts of insert 10. Reservoir 18 holds protective lubricant 20. There is a dispenser 22 at the threaded end of the insert. Dispenser 22, slows the flow of the lubricant 20 into an engine. This keeps the corrodible parts coated for an extended time. The dispenser 22 could be constructed of either foam rubber, plastic, sintered bronze or another suitable porous material. The insert 10 is sealed by an integral annular protruding lip 26 against an engine's cylinder head 28.

Figure 4:
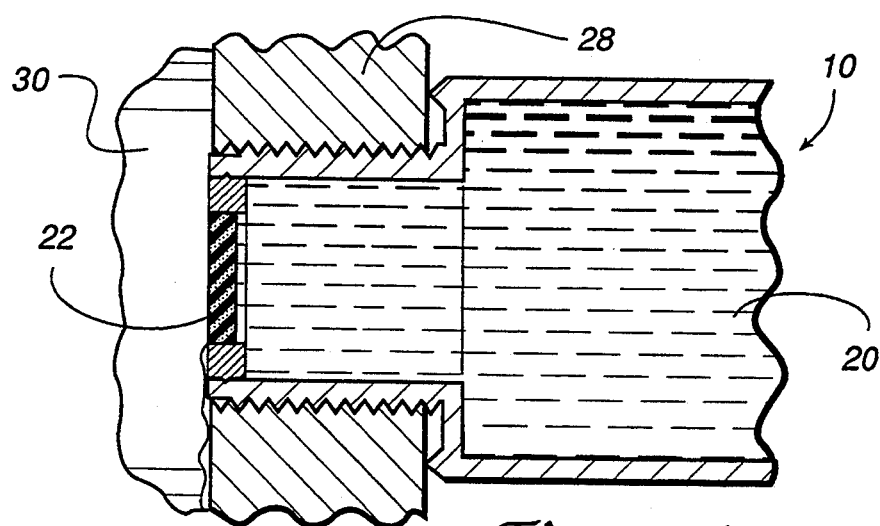
FIG. 4 is an enlarged sectional view of the threaded end of the insert shown in FIG. 3.

FIG. 4 is an enlarged sectional view of the threaded end of insert 10. Lubricant 20 flows by capillary action through the dispenser 22 eventually flowing into the combustion chamber 30 of an engine. The dispenser is affixed in a hollow disk 24 which may snap into or be held by other means in the threaded end of insert 10.

Figure 5:
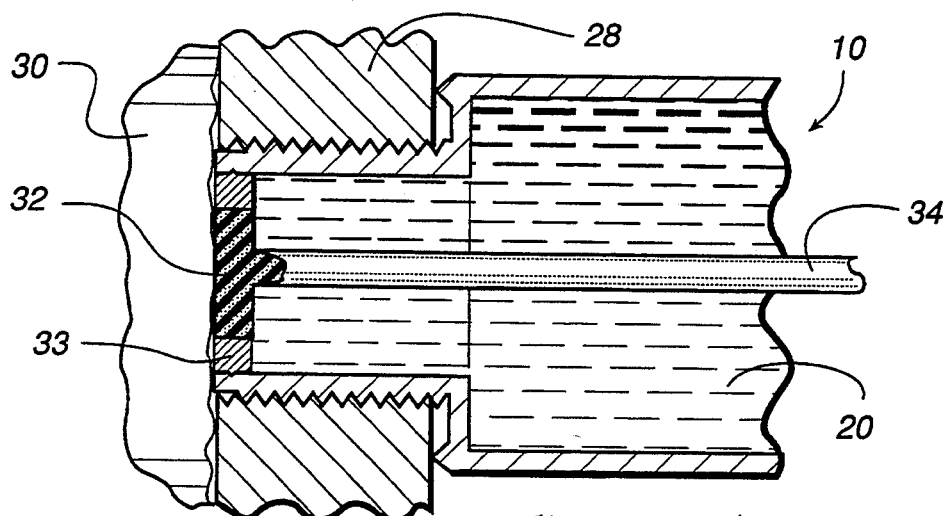
FIG. 5 is an enlarged sectional view of the threaded end of the insert shown in FIG. 3 with the addition of a dispensing disk having a wick.

FIG. 5 is another enlarged sectional view of the threaded end of insert 10. In this view a porous dispenser 32 is secured by suitable means to the inside of ring 33 which snaps into the threaded end of insert 10. Integral with the dispenser is a wick 34 which extends through the hollow center of the insert. The dispenser with the integral wick allows the insert 10 to be in any position and still dispense lubricant 20 to a combustion chamber 30 of an engine. The lubricant 20 will then travel to the parts of the combustion chamber by gravity and capillary action.

Figure 6:
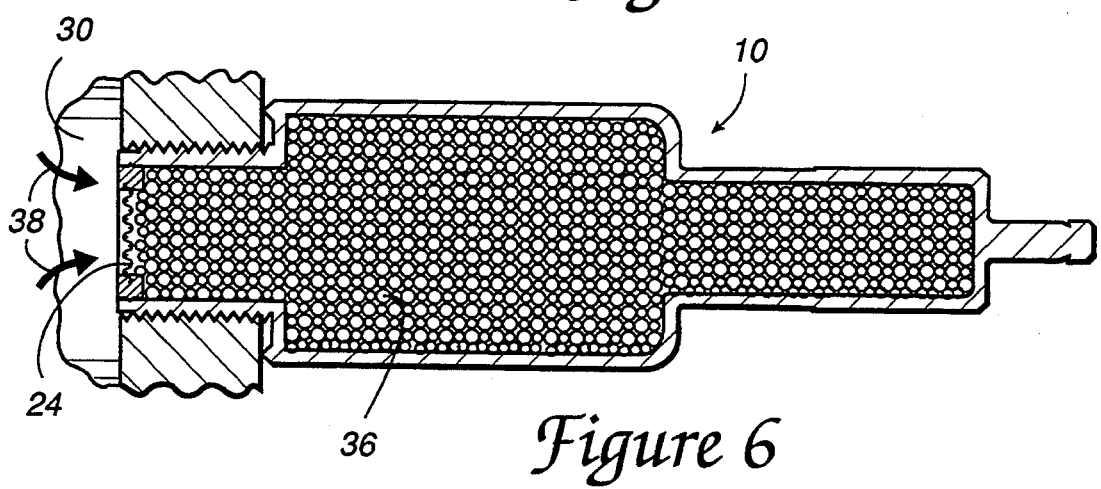
FIG. 6 is a longitudinal section of the insert showing a desiccant filling the reservoir of the insert.

Referring to FIG. 6, a cap with a screen 24 is used when the insert is filled with desiccant. The insert 10 is filled with a desiccant 36. Moisture from the combustion chamber 30 travels in the direction of the arrows 38 and is absorbed by the desiccant in the insert. This lowers the humidity in the combustion chamber, protecting it from corrosion.

While the invention has been particularly shown and described with reference to certain preferred embodiments, it will be understood by those skilled in the art that various alterations and modifications in form and in detail may be made therein without departure from the spirit and scope of the invention. Accordingly, it is intended that the following claims cover all such alterations and modifications as may fall within the true spirit and scope of the invention.

What is claimed is:

1. An insert for fastening into a spark plug hole of an internal combustion engine for protecting said engine from damage during extended periods of non-use, said insert comprising:

a hollow main body forming a reservoir having first and second ends, said first end being externally threaded for engaging corresponding threads of a spark plug hole in the engine and having an opening into said reservoir, said reservoir holding a supply of engine protective material retained by a porous disk shaped dispenser.

2. The insert as claimed in claim 1 further including within said reservoir a lubricant for passing said lubricant into a motor combustion chamber through said porous dispenser.

3. The insert as claimed in claim 1 further including within said reservoir a desiccant for drawing moisture from a motor combustion chamber through said porous dispenser into said reservoir.

4. The insert as claimed in claim 1 wherein integral to said second end of said insert is a male connector and a stud for receiving a spark plug wire terminal.

5. The insert as claimed in claim 1 having a raised annular lip integral with a surface perpendicular to tile axis of the insert and adjacent threads in said threaded end for sealingly engaging with a corresponding surface on an engine.

6. An insert for fastening into a spark plug hole of an internal combustion engine for protecting said engine from damage during extended periods of non-use, said insert comprising:

A hollow main body forming a reservoir having first and second ends, said first end being externally threaded for engaging corresponding threads of a spark plug hole in the engine and having an opening into said reservoir, said reservoir holding a supply of engine protective lubricant retained by a porous disk shaped dispenser having an integral wick extending within said reservoir.

* * * * *